Jan. 24, 1950

G. HEPP 2,495,634

VARIABLE REACTANCE MEANS FOR FREQUENCY MODULATING AN OSCILLATOR

Filed July 20, 1946

GERARD HEPP.
INVENTOR.

BY [signature]

AGENT.

Patented Jan. 24, 1950 2,495,634

UNITED STATES PATENT OFFICE 2,495,634

VARIABLE REACTANCE MEANS FOR FREQUENCY MODULATING AN OSCILLATOR

Gerard Hepp, Eindhoven, Netherlands, assignor to Hartford National Bank and Trust Company, Hartford, Conn., as trustee Application July 20, 1946, Serial No. 685,193
In the Netherlands May 6, 1943

Section 1, Public Law 690, August 8, 1946
Patent expires May 6, 1963

6 Claims. (Cl. 332—18)

This invention relates to a circuit-arrangement for acting upon the natural frequency of an oscillatory circuit by means of a reactance included in the oscillatory circuit, the value of which can be changed by means of a modulating current or voltage. A circuit-arrangement of this kind may be utilised, for instance, in the frequency-modulation of a generator.

In many cases and particularly in the case of frequency-modulation of a generator, it is desirable that a linear relation should exist between the natural frequency of the oscillatory circuit and the amplitude of the modulating current or voltage.

To ensure this, it is known to utilise negative feedback of frequency, which is effected by that, by means of a frequency detector, frequency-modulated oscillations are converted into amplitude-modulated oscillations and rectified, whereafter the rectified low-frequency current or voltage thus obtained acts in anti-phase with the initial modulating current or voltage upon the value of the variable reactance. It is thus achieved that the relation which exists between the natural frequency of the circuit and the amplitude of the modulating current or voltage is rendered substantially linear.

This method has the drawback that a complicated frequency detector is required in which the frequency-modulated high-frequency oscillations are converted into amplitude-modulated oscillations. Besides, the risk of undesirable oscillations occurring with a strong negative feedback in such a complicated circuit arrangement is very great.

The invention purports to provide a simple method of negative feedback of frequency. According to the invention this object is attained by that an amplitude-modulated voltage derived from the oscillatory circuit is supplied to an amplitude detector and by that the detected voltage, dependent upon the amplitude modulation, influences the modulating current or voltage so as to obtain a substantially linear relation between the modulating current or voltage and the natural frequency of the oscillatory circuit.

In a copending patent application of applicant (No. 667,446, filed May 4, 1946) it was already suggested to use negative feedback in a reactance tube. To this end, the primary winding of a transformer is included in the anode circuit of the tube. The voltage set up at the secondary winding by the anode current is supplied to the control grid of the reactance tube in anti-phase with the initial modulating voltage. Such a negative feedback in a reactance tube is not claimed in the present application of patents.

Figure 1:
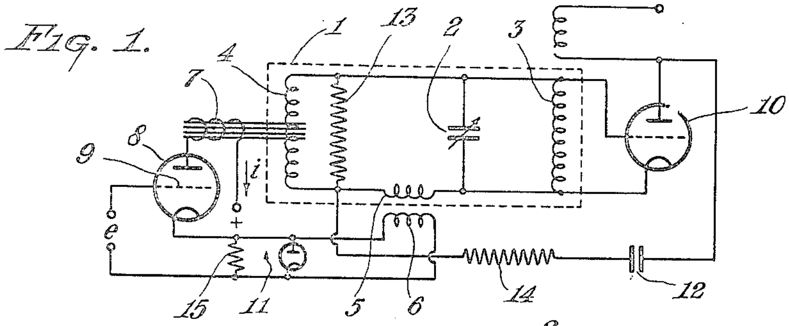
Figure 2:
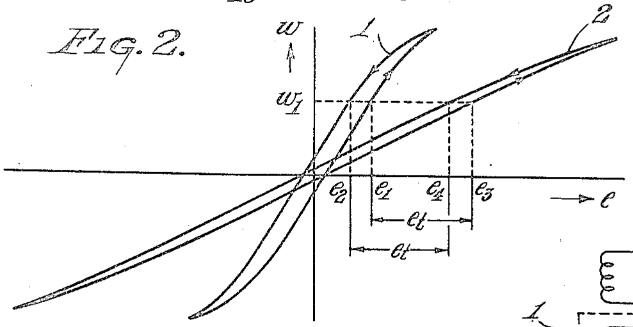
Figure 3:
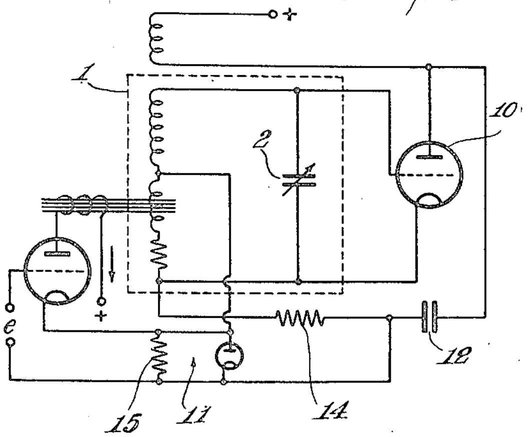
Figure 4:
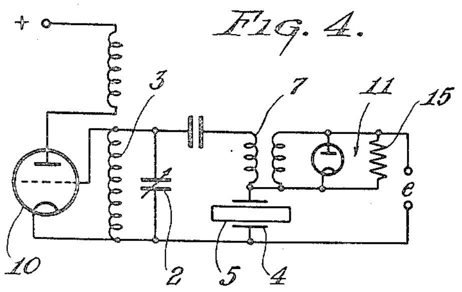
Figure 5:
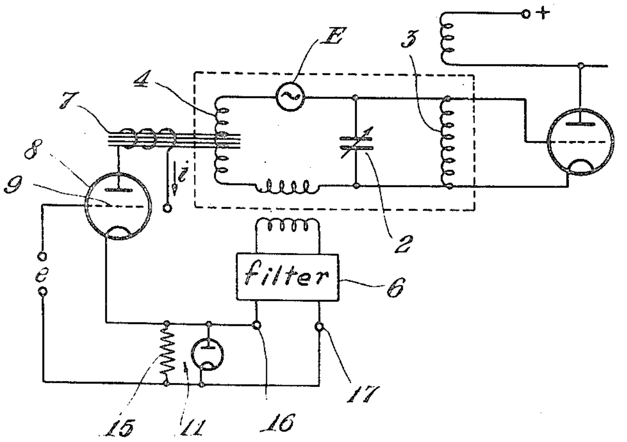

In order that the invention may be clearly understood and readily carried into effect, it will now be explained more fully with reference to the accompanying drawings in which:

Figure 1 is a schematic circuit diagram of one preferred embodiment of the invention, Fig. 2 is a graph illustrative of the behavior of the circuit in Fig. 1, Fig. 3 is a schematic diagram of another preferred embodiment of the invention, Fig. 4 is a schematic diagram of yet another preferred embodiment of the invention, and Fig. 5 is a schematic diagram of still another preferred embodiment of the invention.

Fig. 1 shows an oscillator comprising negative feedback, which is modulated in frequency. The arrangement comprises a frequency-determining oscillatory circuit 1 constituted by a condenser 2, a constant inductance coil 3 and a variable inductance coil 4 which is connected in series with the primary winding 5 of a transformer 6. The inductance coil 4 comprises a core 7 of ferromagnetic material, which core is premagnetised by the anode current of a tube 8, so that the permeability of the core material and consequently the inductance of the coil 4 is dependent on the value of the anode current. This current is controlled by a modulating voltage set up at the control grid 9 of the tube 8. The frequency-determining oscillatory circuit is included in the grid circuit of a tube 10, whose anode circuit includes a negative feedback coil coupled to the frequency-determining circuit. This negative feedback coupling produces oscillations of a frequency which is substantially determined by the natural frequency of the frequency-determining oscillatory circuit. The amplitude of this oscillation is determined by the characteristic of the tube 10 and consequently will have a substantially constant value which is independent of the natural frequency of the frequency-determining oscillatory circuit. If, now, a modulating voltage is supplied to the control grid 9, the value of the variable inductance coil 4 and, consequently, the natural frequency of the oscillatory circuit 1 vary.

It has been found that the relation which exists between the natural frequency of the circuit and the amplitude of the modulating voltage is not exactly linear. In order to obtain a more linear relation, use is made of negative feedback of frequency according to the invention. Since the voltage of the oscillatory circuit is practically constant, there occurs across the primary winding 5 of the transformer 6, which has a small impedance with respect to the inductance coil 4, a voltage substantially inversely proportional to the value of the variable inductance coil 4. By means of the transformer 6, this amplitude-modulated voltage is supplied to an amplitude detector 11, whereafter the negative feedback is obtained by supplying the detected voltage and the modulating voltage $e$ to the control grid 9 of the tube 8. The negative feedback permits of obtaining a linear relation between the voltage across the primary winding 5 of the transformer 6 and the modulating voltage $e$, which needs no further explanation, since this is a well-known consequence of negative feedback. Since the former voltage is inversely proportional to the value of the variable inductance coil 4, it will also be ensured by the negative feedback that the value of the variable inductance coil varies so as to be inversely proportional to the modulating voltage $e$ and since the natural frequency of the frequency-determining oscillatory circuit varies so as to be inversely proportional to the value of the variable inductance the negative feedback procures a linear relation between the natural frequency of the frequency-determining oscillatory circuit and the modulating voltage $e$.

In the foregoing it has been supposed that the voltage across the primary winding 5 is inversely proportional to the value of the variable inductance 4, if the voltage of the oscillatory circuit is constant. If this is not the case, it can nevertheless be ensured that the voltage across the primary winding 5 is inversely proportional to the value of the variable inductance coil, for instance, by utilising the circuit-arrangement of Fig. 5. To this end, this circuit includes an alternating voltage $e$ of constant amplitude and of another frequency than the natural frequency of the oscillatory circuit. The combination of the coil 3 and the condenser 2 substantially constitutes a short-circuit for this frequency and the current flowing through the coil 4 is in this case substantially inversely proportional to the inductance of this coil. The voltage across the primary winding 5, in as much as it originates from the source of supply $e$, is consequently inversely proportional to the value of the variable inductance and the voltage to be used for the negative feedback can be derived from the terminals 16, 17 via a filter 6 which only passes the frequency of the alternating voltage $e$. If the inductance coil has too great losses and, consequently, may no longer be considered as a pure inductance, the voltage across the primary winding 5 will not be exactly inversely proportional to the value of the variable inductance, not even in the case of a constant voltage of the circuit. The losses may be considered to be caused by a loss resistance 13 shown in Fig. 1, which is connected in parallel with the coil 4. In many cases the value of this parallel damping resistance will be such that the impedance of the inductance coil will slightly differ from the impedance of the reactive part of this inductance coil. If, however, the losses become too great, the voltage across the primary winding 5 of the transformer will no longer be exactly inversely proportional to the value of the inductance coil 4. Consequently, in many cases it will not be possible to obtain adequate linearity in spite of the negative feedback. If the loss resistance is constant and not too much dependent on the premagnetising current, an improvement may be obtained by providing a resistance 14 connecting the anode of the oscillatory tube, via a great capacity 12, to the common point of the inductance coil 4 and the primary winding 5. The resistance 14 is so proportioned that the current flowing through the primary winding 5 via this resistance is substantially equal but in antiphase with the component produced by the loss resistance 13, of the current flowing through the variable inductance coil 4 and the primary winding 5. It is thus ensured that the voltage across the primary winding 5 is only dependent upon the inductive component of the current flowing through the variable inductance coil, this voltage thus varying so as to be inversely proportional to the value of the variable inductance coil.

If ferromagnetic core material is used, hysteresis occurs, for instance, that there is a non-ambiguous relation between the premagnetising current and the magnetic inductance. Consequently the relation between the value of the variable inductance and the premagnetising current will not be ambiguous either, so that also the natural frequency of the oscillatory circuit may have different values at a determined premagnetising current. An additional advantage of the circuit arrangement according to the invention is that this undesirable influence of the hysteresis is reduced by the negative feedback of frequency.

In Fig. 2, curve 1 shows the relation which exists between the modulating grid voltage $e$ and the natural frequency $w$ in the absence of negative feedback. If the modulating voltage, starting from a small value, increases, the natural frequency of the oscillatory circuit will be $w_1$ at the value $e_1$ of the modulating voltage. If the modulating voltage, starting from a high value, decreases the natural frequency $w_1$ will be attained at the value $e_2$ of the modulating voltage. Now, if negative feedback of frequency is used, the natural frequency $w_1$ with an increase of the modulating voltage $e$ will be attained only at a value $e_3$, which is higher than $e_1$ and this is to such an extent that the difference between $e_3$ and $e_1$ is equal to the negative feedback voltage $e_t$, set up across resistance 15 (Fig. 1). With a decrease of the modulating voltage, the natural frequency $w_1$, is attained at a value $e_4$. Since the negative feedback voltage $e_t$ has a determined value at a determined frequency, the difference between $e_4$ and $e_2$ will be equal to that between $e_3$ and $e_1$. The relation which exists between the modulating voltage and the natural frequency with negative feedback is shown by curve 2. Now, the influence of hysteresis is reduced, since at a determined frequency, for instance $w_1$, the corresponding possible deviation of the modulating voltage has become comparatively smaller, that is to say of the value $$\frac{e_2-e_1}{e_2} \text{ to } \frac{e_4-e_3}{e_4} \text{ or } \frac{e_2-e_1}{e_4}$$

Even when the inductance of the oscillatory circuit is constituted by a variable inductance coil arranged in series with an invariable inductance, the negative feedback of frequency can be obtained in a simple manner.

Fig. 3 shows a circuit arrangement of this kind in which the inductance of the oscillatory circuit is constituted by a variable inductance coil 4 arranged in series with the invariable inductance 3, the former having a low value with respect to the latter. The voltage across the variable inductance coil 4 will be proportional to the value of this inductance. This voltage modulated in amplitude is detected by the detector 11 and together with the modulating voltage e, is supplied to the control grid 9 of the tube 8 which controls the premagnetising current. In this case it is possible to obtain a good negative feedback of frequency in the same manner as described with reference to Fig. 1. If the variable inductance coil 4 has too great losses, the detrimental influence thus exerted upon the linear relation between the modulating voltage and the natural frequency can be compensated in the same manner as described with reference to Fig. 1, for instance by providing a resistance 14 which connects the anode of the oscillatory tube 10, via a small capacity 12, to that end of the variable inductance 2 which is secured to the cathode of the oscillatory tube 10. The value and the phase of the voltage set up across the resistance 14 is chosen so that the total voltage set up across the adjustable inductance and the resistance 14 is directly proportional to the value of the variable inductance coil, that is to say, equal and opposite to the voltage produced across the variable inductance coil by the ohmic component of the current flowing through this coil.

Fig. 4 illustrates a method of obtaining a linear relation between the modulating voltage and the natural frequency of the oscillatory circuit in the event of the natural frequency being influenced by means of a variable capacity. In this case the frequency-determining oscillatory circuit is substantially constituted by a condenser 2, a constant inductance coil 3 and a variable inductance 4 which is connected in parallel with the condenser 2. The capacity 4 contains a dielectric 5 having a dielectric constant, the value of which depends on the field strength. A suitable dielectric is, for example, Seignette salt. The field strength and hence the value of the capacity is influenced by modulating voltage e impressed on the capacity. Now, the current through the variable capacity depends on the value of this capacity and by transforming and detecting the amplitude-modulated voltage set up across the small inductance 7 arranged in series with the capacity 4 and by feeding back the detected voltage across the resistance 15 in anti-phase with the initial modulating voltage e a good linearity between the amplitude of the modulating voltage and the natural frequency of the oscillatory circuit can be obtained in a similar manner as already described with reference to Fig. 2 by means of the negative feedback. If the capacity 4 has losses similar steps can be taken as those already described with reference to Fig. 1, so that in that case also the desired linear relation is obtainable.

What I claim is:

1. In a system for frequency-modulating a wave in correspondence with the instantaneous amplitude of a signal, the combination comprising a wave generator provided with a resonant circuit having a variable reactance element for controlling the frequency of said circuit, a frequency-modulator responsive to said signal and arranged to vary the reactance of said element in accordance with the instantaneous amplitude of said signal, means to derive from said generator an oscillatory voltage whose amplitude varies according to the reactance of said element, amplitude detection means to detect said voltage, and means to apply said detected voltage as an input to said modulator in phase opposition with said signal whereby a substantially linear relation is effected between the instantaneous amplitude of said signal and the frequency of said generator.

2. In a system for frequency-modulating a wave in correspondence with the instantaneous amplitude of a signal, the combination comprising a wave generator provided with a resonant circuit including a variable inductor for controlling the frequency of said circuit, a frequency-modulator responsive to said signal and arranged to vary the reactance of said inductor in accordance with the instantaneous amplitude of said signal, a detector for amplitude modulation, a transformer having a primary winding connected in series with said inductor and a secondary winding connected to said detector whereby said detector yields an output voltage whose amplitude varies substantially inversely in proportion to the reactance of said inductor, and means to apply said output voltage to said modulator in phase opposition with said signal.

3. In a system for frequency-modulating a wave in correspondence with the instantaneous amplitude of a signal, the combination comprising a wave generator provided with a resonant circuit formed by a condenser in parallel with an inductor having a ferromagnetic core, a frequency-modulator including an electron discharge tube having cathode, grid and anode electrodes, a coil surrounding said core and means to apply a positive potential through said coil to said anode, said signal being applied to the grid of said tube whereby the reactance of said inductor varies in accordance with the instantaneous amplitude of said signal, a detector of amplitude modulation, a transformer having a primary winding interposed between said inductor and condenser in said resonant circuit and a secondary winding connected to said detector, said detector producing an output voltage whose amplitude varies inversely in proportion to the reactance of said inductor, and means to apply said output voltage to said grid in phase opposition with said signal.

4. An arrangement as set forth in claim 3 further characterized by the fact that said primary winding has an impedance whose value is low relative to the impedance of said inductor.

5. In a system for frequency-modulating a wave in correspondence with the instantaneous amplitude of a signal, the combination comprising a wave generator provided with a resonant circuit formed by a condenser in parallel with an inductor having a ferromagnetic core, a frequency-modulator including an electron discharge tube having cathode, grid and anode electrodes, a coil surrounding said core and means to apply a positive potential through said coil to said anode, said signal being applied to the grid of said tube whereby the reactance of said inductor varies as the instantaneous amplitude of said signal, an alternating-current source interposed between one end of said inductor and said condenser, a detector of amplitude modulation, a transformer having a primary winding interposed between the other end of said inductor and said condenser and a secondary winding connected to said detector, said detector yielding an output voltage which varies inversely in proportion to the reactance of said inductor, and means to apply said output voltage in phase opposition with said signal to the grid of said tube.

6. In a system for frequency modulating a wave in correspondence with the instantaneous amplitude of a signal, the combination comprising a wave generator provided with a resonant circuit having a variable inductor connected in series with a fixed inductor across a condenser, a frequency-modulator responsive to said signal and arranged to vary the reactance of said variable inductor in accordance with the instantaneous amplitude of said signal, a detector of amplitude modulation connected to said variable inductor for deriving a voltage therefrom whose amplitude is inversely proportional to the reactance of said inductor, and means for applying said voltage in phase opposition to said signal as an input to said modulator.

GERARD HEPP.

REFERENCES CITED

The following references are of record in the file of this patent:

UNITED STATES PATENTS

| Number | Name | Date |
|---|---|---|
| 2,000,584 | Fichandler | May 7, 1935 |
| 2,279,660 | Crosby | Apr. 14, 1942 |
| 2,334,726 | Rankin | Nov. 23, 1943 |